US 10,868,646 B1

(12) United States Patent
Pawar et al.

(10) Patent No.: US 10,868,646 B1
(45) Date of Patent: Dec. 15, 2020

(54) SELECTING SUBCARRIER SPACING BASED ON TRAFFIC TYPE

(71) Applicant: Sprint Spectrum LP, Overland Park, KS (US)

(72) Inventors: Hemanth Pawar, Brambleton, VA (US); Shilpa Kowdley Srinivas, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/434,291

(22) Filed: Jun. 7, 2019

(51) Int. Cl.
*H04L 5/00* (2006.01)
*H04W 28/06* (2009.01)
*H04L 12/851* (2013.01)

(52) U.S. Cl.
CPC ............ *H04L 5/003* (2013.01); *H04L 47/24* (2013.01); *H04W 28/06* (2013.01)

(58) Field of Classification Search
CPC ..... H04L 5/003; H04L 47/24; H04L 47/2408; H04L 47/2441; H04L 47/2483; H04W 28/06; H04W 28/02; H04W 28/0252
See application file for complete search history.

(56) References Cited

U.S. PATENT DOCUMENTS

| 10,038,581 B2 | 7/2018 | Zhang et al. | |
| 2015/0256308 A1* | 9/2015 | Ma | H04W 72/042 370/330 |
| 2015/0282178 A1* | 10/2015 | Kim | H04B 7/2656 370/329 |
| 2016/0227440 A1* | 8/2016 | Forssell | H04L 5/0098 |
| 2016/0294521 A1* | 10/2016 | Au | H04L 27/2602 |
| 2017/0164350 A1* | 6/2017 | Sun | H04L 5/0007 |
| 2018/0097679 A1* | 4/2018 | Zhang | H04W 72/1268 |
| 2018/0254794 A1* | 9/2018 | Lee | H04J 11/0069 |
| 2018/0270713 A1* | 9/2018 | Park | H04L 5/0053 |
| 2018/0270791 A1* | 9/2018 | Park | H04W 68/04 |
| 2018/0270792 A1* | 9/2018 | Park | H04W 76/28 |
| 2018/0279289 A1* | 9/2018 | Islam | H04W 72/1242 |
| 2019/0058556 A1* | 2/2019 | Siomina | H04L 5/0058 |
| 2019/0059078 A1* | 2/2019 | Noh | H04L 5/0092 |
| 2019/0149257 A1* | 5/2019 | Jiang | H04J 13/0003 370/342 |
| 2019/0166612 A1 | 5/2019 | Yokomakura | H04W 72/04 |
| 2019/0215777 A1* | 7/2019 | Kang | H04L 5/0092 |
| 2019/0254110 A1* | 8/2019 | He | H04L 5/005 |
| 2019/0313348 A1* | 10/2019 | Molavianjazi | H04W 52/367 |
| 2020/0084767 A1* | 3/2020 | Wolff | H04W 72/0446 |

* cited by examiner

Primary Examiner — Kevin D Mew

(57) ABSTRACT

Selecting a subcarrier spacing for a wireless sector includes determining a predominant traffic type within the wireless sector, the predominant traffic type being based on traffic requirements of a plurality of wireless devices operating within the wireless sector, and selecting a subcarrier spacing for the wireless sector based on the predominant traffic type. Guaranteed bit rate, low-latency, VoIP, and heavy traffic types result in selection of wider subcarrier spacings, so as to limit inter-subcarrier interference.

20 Claims, 6 Drawing Sheets

SELECTING SUBCARRIER SPACING BASED ON TRAFFIC TYPE

TECHNICAL BACKGROUND

A heterogeneous network can be configured to include various types of access nodes that are configured to deploy wireless air interfaces of different types, such as 4G long-term evolution (LTE), 5G new radio (NR), and so on. Further, these different wireless air interfaces or sectors may be configured differently (i.e. with different subcarrier spacing, frame configuration, etc.). For example, while 4G LTE networks are configured to use a 15 kHz subcarrier spacing, 5G NR networks can be configured with different subcarrier spacings, including 15 KHz, 30 KHz, 60 KHz, and so on. However, in current implementations, the subcarrier spacing for 5G networks is static, in that it remains the same for a given sector unless reconfigured for that given sector. Further, while using a wider subcarrier spacing can improve spectral efficiency and minimize inter-subcarrier interference (which can be useful for certain types of traffic), using a narrower subcarrier spacing increases the amount of subcarriers in a given frequency range and provides a longer OFDM symbol length. Thus, there are advantages and disadvantages to using each different subcarrier spacing, and the current state of the art is deficient in being able to dynamically leverage these advantages and disadvantages throughout a wireless network.

OVERVIEW

Exemplary embodiments described herein include methods, systems, and processing nodes for selection of subcarrier spacing in a wireless network based on predominant traffic type of a wireless sector. An exemplary method for selecting a subcarrier spacing in a wireless network includes determining a predominant traffic type within a wireless sector, the predominant traffic type being based on traffic requirements of a plurality of wireless devices operating within the wireless sector, and selecting a subcarrier spacing for the wireless sector based on the predominant traffic type.

An exemplary system for selecting a subcarrier spacing in a wireless network includes a processing node and a processor coupled to the processing node. The processor may be configured to perform operations including determining a traffic requirement for wireless devices operating within a wireless sector, wherein the wireless sector is deployed by a first antenna array of an access node, determining a predominant traffic type for the sector based on the traffic requirement of the wireless devices, and instructing the access node to select a subcarrier spacing for the wireless sector based on the predominant traffic type.

An exemplary processing node for selecting a subcarrier spacing in a wireless network is configured to perform operations including: responsive to determining that wireless devices served by an access node are transmitting or receiving a first type of traffic, instructing the access node to utilize a first subcarrier spacing, and responsive to determining that the first type of traffic changes to a second type of traffic, instructing the access node to utilize a second subcarrier spacing.

DETAILED DESCRIPTION

Figure 1:
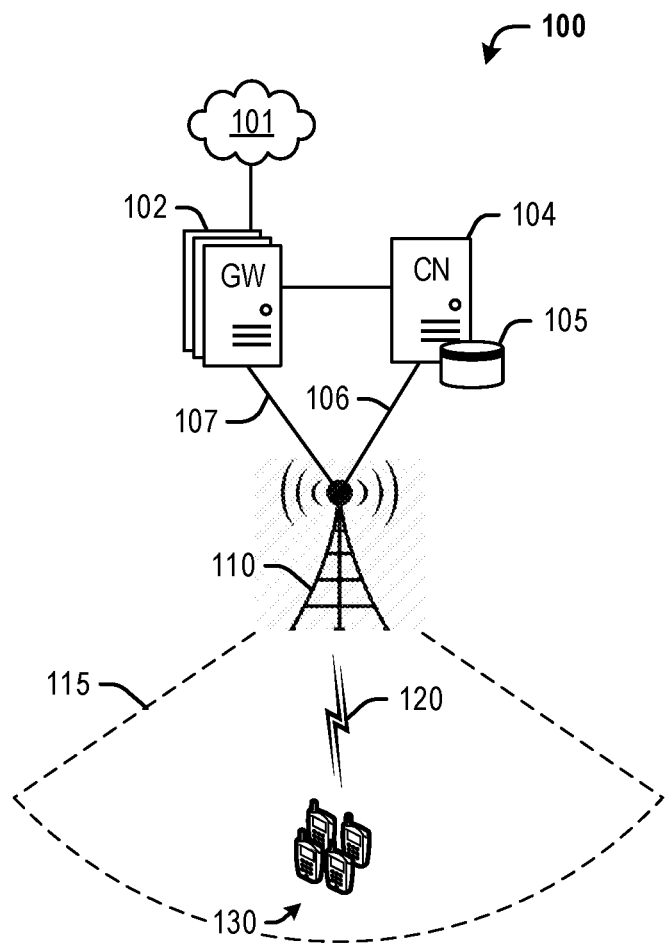
FIG. 1 illustrates an exemplary system for selecting a subcarrier spacing in a wireless network.

The disclosed embodiments illustrate methods, systems, and processing nodes for selection of subcarrier spacing in a wireless network based on predominant traffic type of a wireless sector. A method for selecting a subcarrier spacing includes determining a predominant traffic type within a wireless sector, the predominant traffic type being based on traffic requirements of a plurality of wireless devices operating within the wireless sector, and selecting a subcarrier spacing for the wireless sector based on the predominant traffic type. The wireless sector can be deployed by a first antenna array of an access node. For example, the access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Thus, in exemplary embodiments, the first antenna array is configured to deploy a first wireless sector, and to transmit the selected subcarrier spacing to all wireless devices within the sector via a master information bit (MIB). Similarly, these operations may be repeated for additional wireless sectors deployed by additional antenna arrays of the access node. In exemplary embodiments illustrated herein, the wireless air interface may comprise physical resources that are arranged in grids of different sizes for different subcarrier spacings. For example, a first plurality of grids of a first size is associated with the first subcarrier spacing, and a second plurality of grids of a second size is associated with the second subcarrier spacing. The sizes may be based on, for example, an arrangement of physical resource blocks in a frequency and/or time domain, as further described herein.

In further exemplary embodiments described herein, determining the predominant traffic type is based on determining a traffic requirement for each wireless device operating within the wireless sector. Determining the traffic requirement for each wireless device operating within the wireless sector (or the predominant traffic type for the sector) can include performing packet inspection of data packets received from and transmitted to each wireless device. For example, performing packet inspection can include deep packet inspection (DPI) of data packets or data traffic transmitted to or received from each wireless device, monitoring signaling traffic to and from each wireless device, or monitoring radio or transport bearers. Further, determining the traffic requirement can include determining that each wireless device requires a different guaranteed bit rate (GBR), or a different latency. The GBR and/or latency can be based on specific applications such as streaming, videoconferencing, voice-over-IP (VoIP), gaming, etc., and traffic associated therewith. Specific applications may be determined by, for instance, inspecting a header of data packets, and obtaining a quality class indicator (QCI) or any other indicator that is associated with the specific application. The type of traffic (i.e. GBR, non-GBR, best-effort, etc.) may be determined based on monitoring a QCI of the bearers between either the access node and wireless devices connected thereto. Such determinations can further be based on requests from the wireless devices or from other network entities to set up said radio and transport bearers. Alternatively or in addition, determining the predominant traffic type comprises determining traffic types for data packets transmitted from and received at an access node deploying the wireless sector. In addition, determining traffic types for data packets transmitted from and received at an access node deploying the wireless sector comprises inspecting a header of bearers set up by the access node. Moreover, the traffic types may be based on an amount of each type of traffic, a number of bearers, or any other metric. Further, the traffic requirement for all wireless devices may be averaged, or a median requirement of traffic type may be obtained based on the traffic type of all wireless devices within the sector. The predominant traffic type can further be based on an average or median traffic type over a period of time, such that the operations are repeated at an expiration of each period of time.

In an exemplary embodiment, the method includes determining that the predominant traffic type comprises one or more of guaranteed bit rate (GBR) traffic, latency-sensitive traffic, or heavy traffic, and selecting a first subcarrier spacing based thereon. The first subcarrier spacing may be wide subcarrier spacing, which includes any subcarrier spacing that meets or exceeds a defined threshold subcarrier spacing. For example, any subcarrier spacing that is 30 kHz or higher may be determined as a wide subcarrier spacing. In another exemplary embodiment, any subcarrier spacing greater than or equal to 60 kHz is a wide subcarrier spacing. Conversely, a narrow subcarrier spacing can be any subcarrier spacing that is below 30 kHz (i.e. 15 kHz), or below 60 kHz (i.e. 15 kHz and 30 kHz). Thus, the method can include determining that the predominant traffic type does not comprise any of guaranteed bit rate (GBR) traffic, latency-sensitive traffic, or heavy traffic, and selecting a second sub carrier spacing based thereon, wherein the second subcarrier spacing comprises a narrow subcarrier spacing, or wherein the second subcarrier spacing is narrower relative to the first subcarrier spacing. Examples of traffic types other than GBR, latency-sensitive, heavy, VoIP, etc. that are able to use narrow subcarrier spacing include any traffic that does not require a guaranteed QoS or low latency, including web browsing, emails, social media, etc. In an exemplary embodiment, a default subcarrier spacing is selected for a wireless sector based on historical trend of traffic requirement, and wider or narrower subcarrier spacings are selected based on changes in the predominant traffic type of wireless devices operating within the sector.

These operations may be performed responsive to determining that a load of the wireless sector rises to meet a threshold. For example, when a load of the wireless sector is high, selecting different subcarrier spacings may alleviate some of the load, depending on the predominant traffic type within the sector. Alternatively or in addition, these operations may be performed responsive to determining that an inter-subcarrier interference of the wireless sector rises to meet a threshold. For example, as described above, small subcarrier spacings are prone to inter-subcarrier interference. Thus, if the inter-subcarrier interference within the sector rises to meet a threshold, then the subcarrier spacing for the sector maybe widened.

Similar operations may be performed by an exemplary system described herein and comprising at least a processing node and a processor coupled to the processing node. A processing node in such an exemplary system may be configured to perform operations including determining a traffic requirement for wireless devices operating within a wireless sector, wherein the wireless sector is deployed by a first antenna array of an access node, determining a predominant traffic type for the sector based on the traffic requirement of the wireless devices, and instructing the access node to select a subcarrier spacing for the wireless sector based on the predominant traffic type. Determining the traffic requirement for the wireless devices is based on one or more of a header, a QCI, or a deep packet inspection for each wireless device. In this system, the operations further comprise determining that the predominant traffic type comprises one or more of guaranteed bit rate (GBR) traffic, latency-sensitive traffic, or heavy traffic, and instructing the access node to select a first subcarrier spacing that is wider than a default subcarrier spacing. The operations further comprise determining that the predominant traffic type does not comprise any of guaranteed bit rate (GBR) traffic, latency-sensitive traffic, or heavy traffic, and instructing the access node to select a second subcarrier spacing that is narrower than the first subcarrier spacing or a default subcarrier spacing. Further, the determining and selecting operations can be performed periodically, or in response to a trigger. The trigger can include, for example, one or more of a load of the wireless sector rising to meet a load threshold, or an inter-subcarrier interference of the wireless sector rising to meet an interference threshold.

Similar operations may be performed by a processing node communicatively coupled to any other network node within the wireless network, such as an access node or a controller node. The processing node can be configured to perform operations including instructing an access node to utilize a first subcarrier spacing responsive to determining that wireless devices served by the access node are transmitting or receiving a first type of traffic, and instructing the access node to utilize a second subcarrier spacing responsive to determining that the first type of traffic changes to a second type of traffic. The first type of traffic can include one or more of guaranteed bit rate (GBR) traffic, latency-sensitive traffic, or heavy traffic, wherein the first subcarrier spacing is at least 30 KHz. Further, the second type of traffic may not include any of guaranteed bit rate (GBR) traffic, latency-sensitive traffic, or heavy traffic, wherein the second subcarrier spacing is below 30 KHz. These and other embodiments are further described herein and with reference to FIGS. 1-7.

FIG. 1 depicts an exemplary system 100 for selecting a subcarrier spacing in a wireless network. System 100 comprises a communication network 101, gateway 102, controller node 104, access node 110, and wireless devices 130. Access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region 115, referred to herein as a sector 115. Wireless devices 130 are located within sector 115 and access network services from access node 110. Access node 110 communicates with wireless devices 130 over corresponding wireless communication links 120, which can include direct communication links, formed beams, multiple-input-multiple-output (MIMO), and so on.

Further, a processing node communicatively coupled to any network node within system 100 (such as, for example, access node 110 or controller node 104) can be configured to select a subcarrier spacing for sector 115 by determining a predominant traffic type of wireless devices 130 within sector 115, and selecting a subcarrier spacing for the wireless sector based on the predominant traffic type. The selected subcarrier spacing may be broadcast to wireless devices 130 within sector 115, enabling wireless devices 130 to receive and transmit data using the selected subcarrier spacing. Determining the predominant traffic type is based on determining a traffic requirement for each wireless device 130 operating within the sector 115. Determining the traffic requirement for each wireless device 130 can include performing packet inspection of data packets received from and transmitted to each wireless device 130. For example, performing packet inspection can include deep packet inspection (DPI) of data packets or data traffic transmitted to or received from each wireless device 130, monitoring signaling traffic to and from each wireless device 130, or monitoring radio or transport bearers, e.g. bearers set up on communication links 120. Further, determining the traffic type can include determining that each wireless device 130 requires a different guaranteed bit rate (GBR), or a different latency. The GBR and/or latency can be based on specific applications such as streaming, videoconferencing, voice-over-IP (VoIP), gaming, etc., and traffic associated therewith. Specific applications may be determined by, for instance, inspecting a header of data packets, and obtaining a quality class indicator (QCI) or any other indicator that is associated with the specific application. The type of traffic (i.e. GBR, non-GBR, best-effort, etc.) may be determined based on monitoring a QCI of the bearers on communication links 120. Such determinations can further be based on requests from the wireless devices 130 or from other network entities to set up said radio and transport bearers. Alternatively or in addition, determining the predominant traffic type comprises determining traffic types for data packets transmitted from and received at access node 110. In addition, determining traffic types for data packets transmitted from and received at access node 110 comprises inspecting a header of bearers set up by the access node 110. Moreover, the traffic types may be based on an amount of each type of traffic, a number of bearers, or any other metric. Further, the traffic requirement for all wireless devices 130 may be averaged, or a median type of traffic may be obtained based on the traffic requirement of all wireless devices 130 within the sector 115. The predominant traffic type can further be based on an average or median traffic type over a period of time, such that the operations are repeated at an expiration of each period of time.

In an exemplary embodiment, operations performed by the processing node include determining that the predominant traffic type comprises one or more of guaranteed bit rate (GBR) traffic, latency-sensitive traffic, or heavy traffic, and selecting a first subcarrier spacing based thereon. The first subcarrier spacing may be wide subcarrier spacing, which includes any subcarrier spacing that meets or exceeds a defined threshold subcarrier spacing. For example, any subcarrier spacing that is 30 kHz or higher may be determined as a wide subcarrier spacing. In another exemplary embodiment, any subcarrier spacing greater than or equal to 60 kHz is a wide subcarrier spacing. Conversely, a narrow subcarrier spacing can be any subcarrier spacing that is below 30 kHz (i.e. 15 kHz), or below 60 kHz (i.e. 15 kHz and 30 kHz). Thus, the operations can include determining that the predominant traffic type does not comprise any of guaranteed bit rate (GBR) traffic, latency-sensitive traffic, or heavy traffic, and selecting a second subcarrier spacing based thereon, wherein the second subcarrier spacing comprises a narrow subcarrier spacing, or wherein the second subcarrier spacing is narrower relative to the first subcarrier spacing. In an exemplary embodiment, a default subcarrier spacing is selected for sector 115 based on historical trend of traffic requirement, and wider or narrower subcarrier spacings are selected based on changes in the predominant traffic type of wireless devices 130 operating within the sector 115.

These operations may be performed responsive to determining that a load of the wireless sector 115 rises to meet a threshold. For example, when a load of the wireless sector 115 is high, selecting different subcarrier spacings may alleviate some of the load on access node 110, depending on the predominant traffic type within the sector 115. Alternatively or in addition, these operations may be performed responsive to determining that an inter-subcarrier interference of the wireless sector 115 rises to meet a threshold. For example, as described above, small subcarrier spacings are prone to inter-subcarrier interference. Thus, if the inter-subcarrier interference within the sector 115 rises to meet a threshold, then the subcarrier spacing for the sector 115 maybe widened.

Further, the processing node within system 100 may be configured to perform operations including determining a traffic requirement for wireless devices 130 operating within wireless sector 115, determining a predominant traffic type for the sector based on the traffic requirement of the wireless devices 130, and instructing the access node 110 to select a subcarrier spacing for the wireless sector 115 based on the predominant traffic type. Alternatively or in addition, the processing node can be configured to perform operations including instructing access node 110 to utilize a first subcarrier spacing responsive to determining that wireless devices 130 are transmitting or receiving a first type of traffic, and instructing the access node 110 to utilize a second subcarrier spacing responsive to determining that the first type of traffic changes to a second type of traffic. As described above, the first type of traffic can include one or more of guaranteed bit rate (GBR) traffic, latency-sensitive traffic, or heavy traffic, wherein the first subcarrier spacing is at least 30 KHz. Further, the second type of traffic may not include any of guaranteed bit rate (GBR) traffic, latency-sensitive traffic, or heavy traffic, wherein the second subcarrier spacing is below 30 KHz Access node 110 can be any network node configured to provide communication between wireless devices 130 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicate with gateway node 102 and controller node 104 via communication links 106, 107. Access node 110 may communicate with other access nodes (not shown) using a direct link such as an X2 link or similar.

Wireless devices 130 may be any device, system, combination of devices, or other such communication platform capable of communicating wirelessly with access node 110 using one or more frequency bands deployed therefrom. Wireless devices 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as historical trends of traffic requirements and load information for sector 115 (and other sectors within system 100), and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
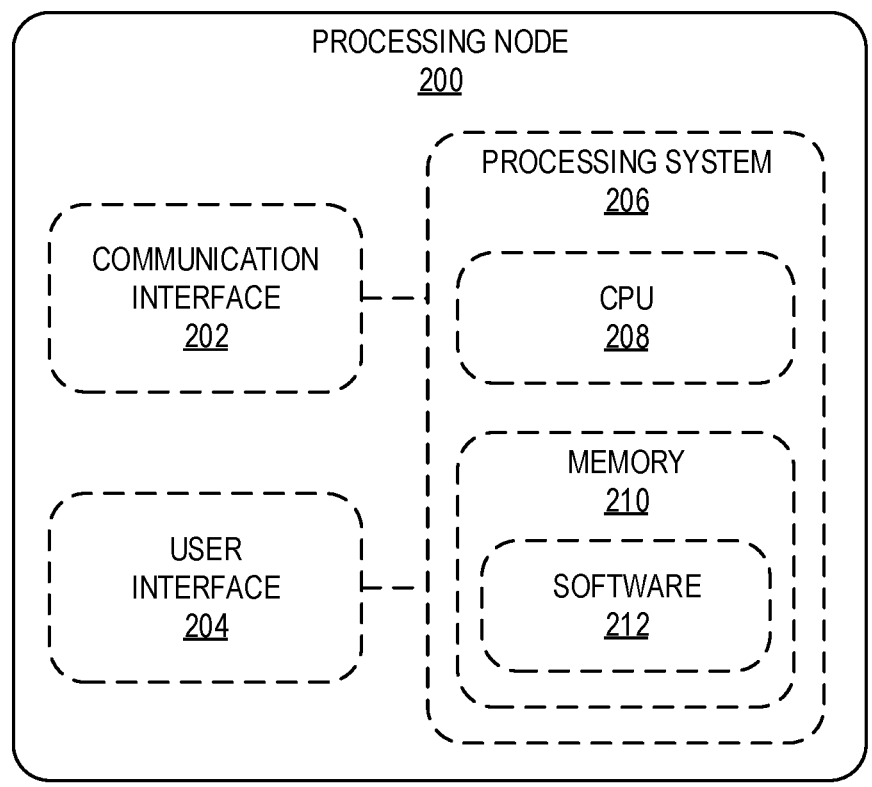
FIG. 2 illustrates an exemplary processing node for selecting a subcarrier spacing in a wireless network.

FIG. 2 depicts an exemplary processing node 200 for selecting a subcarrier spacing in a wireless network. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 includes instructions that enable processing node 200 to perform operations comprising determining a predominant traffic type within a wireless sector, the predominant traffic type being based on traffic requirements of a plurality of wireless devices operating within the wireless sector, and selecting a subcarrier spacing for the wireless sector based on the predominant traffic type. In another exemplary embodiment, software 212 includes instructions that enable processing node 200 to perform operations comprising determining a traffic requirement for wireless devices operating within a wireless sector, wherein the wireless sector is deployed by a first antenna array of an access node, determining a predominant traffic type for the sector based on the traffic requirement of the wireless devices, and instructing the access node to select a subcarrier spacing for the wireless sector based on the predominant traffic type. In yet another exemplary embodiment, software 212 includes instructions that enable processing node 200 to perform operations comprising: responsive to determining that wireless devices served by an access node are transmitting or receiving a first type of traffic, instructing the access node to utilize a first subcarrier spacing, and responsive to determining that the first type of traffic changes to a second type of traffic, instructing the access node to utilize a second subcarrier spacing.

Figure 3:
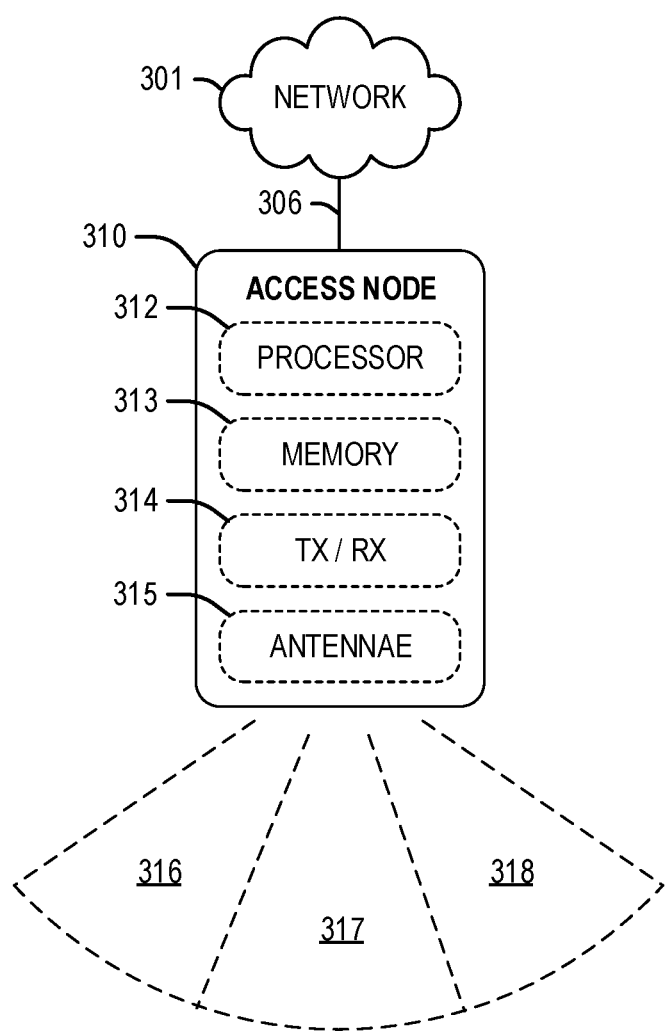
FIG. 3 illustrates an exemplary access node for selecting a subcarrier spacing in a wireless network.

FIG. 3 depicts an exemplary access node 310 for selecting a subcarrier spacing in a wireless network. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over wireless sectors 316, 317, and 318. One pair of transceivers and antennae are illustrated herein solely to simplify the written description, and it may be evident to those having ordinary skill in the art, that any combination of transceivers and antennae may be incorporated in order to deploy different sectors that are configured with different subcarrier spacings, as well as formed beams, MU-MIMO data streams, and/or to facilitate communication with other network nodes on network 301. Further, access node 310 is communicatively coupled to network 301 via communication interface 306, which may be any wired or wireless link as described above.

In an exemplary embodiment, memory 313 includes instructions that enable access node 310 to perform operations comprising determining a predominant traffic type within at least one of wireless sectors 316, 317, 318, the predominant traffic type being based on traffic requirements of a plurality of wireless devices operating within the wireless sector, and selecting a subcarrier spacing for the wireless sector based on the predominant traffic type. In another exemplary embodiment, memory 313 includes instructions that enable access node 310 to perform operations comprising determining a traffic requirement for wireless devices operating within a wireless sector from among wireless sectors 316, 317, 318, wherein the wireless sector is deployed by a first antenna array 315 of access node 310, determining a predominant traffic type for the sector based on the traffic requirement of the wireless devices, and instructing the access node 310 to select a subcarrier spacing for the wireless sector based on the predominant traffic type. In yet another exemplary embodiment, memory 313 includes instructions that enable access node 310 to perform operations comprising: responsive to determining that wireless devices served by access node 310 are transmitting or receiving a first type of traffic, instructing the access node 310 to utilize a first subcarrier spacing, and responsive to determining that the first type of traffic changes to a second type of traffic, instructing the access node 310 to utilize a second subcarrier spacing.

Figure 4:
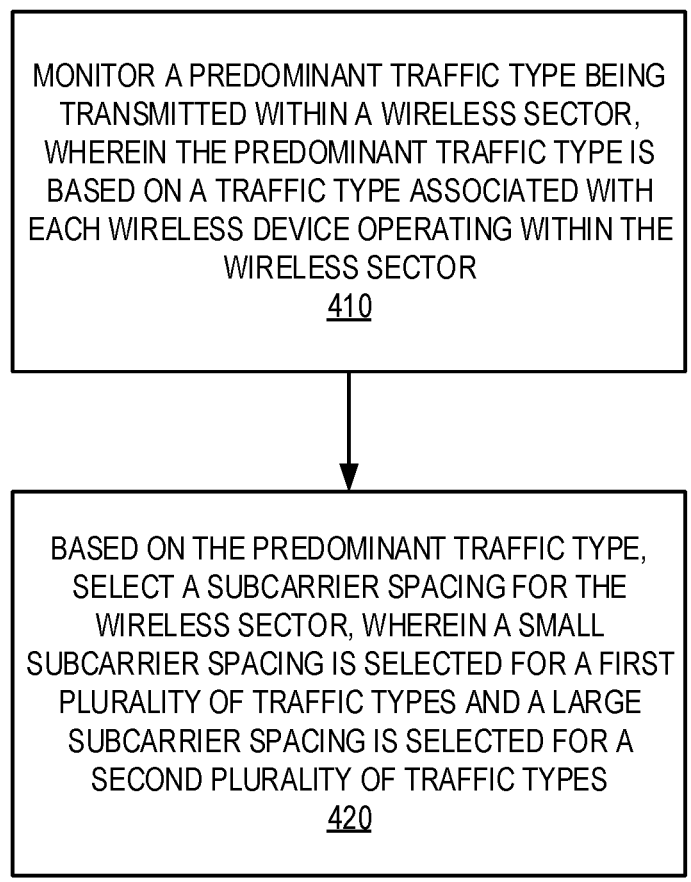
FIG. 4 illustrates an exemplary method for selecting a subcarrier spacing in a wireless network.

FIG. 4 illustrates an exemplary method for selecting a subcarrier spacing in a wireless network. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, a predominant traffic type for a wireless sector is monitored. The predominant traffic type can be based on traffic requirements of a plurality of wireless devices operating within the wireless sector. The wireless sector can be deployed by a first antenna array of an access node. For example, the access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Further, determining the predominant traffic type is based on determining a traffic requirement for each wireless device operating within the wireless sector. Determining the traffic requirement for each wireless device operating within the wireless sector (or the predominant traffic type for the sector) can include performing packet inspection of data packets received from and transmitted to each wireless device (e.g. DPI), monitoring signaling traffic to and from each wireless device, or monitoring radio or transport bearers. Further, determining the traffic requirement can include determining that each wireless device requires a different guaranteed bit rate (GBR), or a different latency. The GBR and/or latency can be based on specific applications such as streaming, videoconferencing, voice-over-IP (VoIP), gaming, etc., and traffic associated therewith. Specific applications may be determined by, for instance, inspecting a header of data packets, and obtaining a quality class indicator (QCI) or any other indicator that is associated with the specific application. The type of traffic (i.e. GBR, non-GBR, best-effort, etc.) may be determined based on monitoring a QCI of the bearers between either the access node and wireless devices connected thereto. Such determinations can further be based on requests from the wireless devices or from other network entities to set up said radio and transport bearers. Alternatively or in addition, determining the predominant traffic type comprises determining traffic types for data packets transmitted from and received at an access node deploying the wireless sector. In addition, determining traffic types for data packets transmitted from and received at an access node deploying the wireless sector comprises inspecting a header of bearers set up by the access node. Moreover, the traffic requirements may be based on an amount of each type of traffic, a number of bearers, or any other metric. Further, the traffic requirement for all wireless devices may be averaged, or a median type of traffic requirement may be obtained based on the traffic requirement of all wireless devices within the sector. The predominant traffic type can further be based on an average or median traffic requirement over a period of time, such that the operations are repeated at an expiration of each period of time.

Further, at 420, based on the predominant traffic type, a subcarrier spacing is selected for the wireless sector. For example, upon determining that the predominant traffic type is among a first plurality of traffic types including guaranteed bit rate (GBR) traffic, latency-sensitive traffic, or heavy traffic, a first subcarrier spacing is selected based thereon. The first subcarrier spacing may be wide subcarrier spacing, which includes any subcarrier spacing that meets or exceeds a defined threshold subcarrier spacing. For example, any subcarrier spacing that is 30 kHz or higher may be determined as a wide subcarrier spacing. In another exemplary embodiment, any subcarrier spacing greater than or equal to 60 kHz is a wide subcarrier spacing. Conversely, a narrow subcarrier spacing can be any subcarrier spacing that is below 30 kHz (i.e. 15 kHz), or below 60 kHz (i.e. 15 kHz and 30 kHz). Thus, upon determining that the predominant traffic type is among a first plurality of traffic types that does not comprise any of guaranteed bit rate (GBR) traffic, latency-sensitive traffic, or heavy traffic, a second subcarrier spacing is selected based thereon, wherein the second subcarrier spacing comprises a narrow subcarrier spacing, or wherein the second subcarrier spacing is narrower relative to the first subcarrier spacing. In an exemplary embodiment, a default subcarrier spacing is selected for a wireless sector based on historical trend of traffic type, and wider or narrower subcarrier spacings are selected based on changes in the predominant traffic type of wireless devices operating within the sector.

Figure 5:
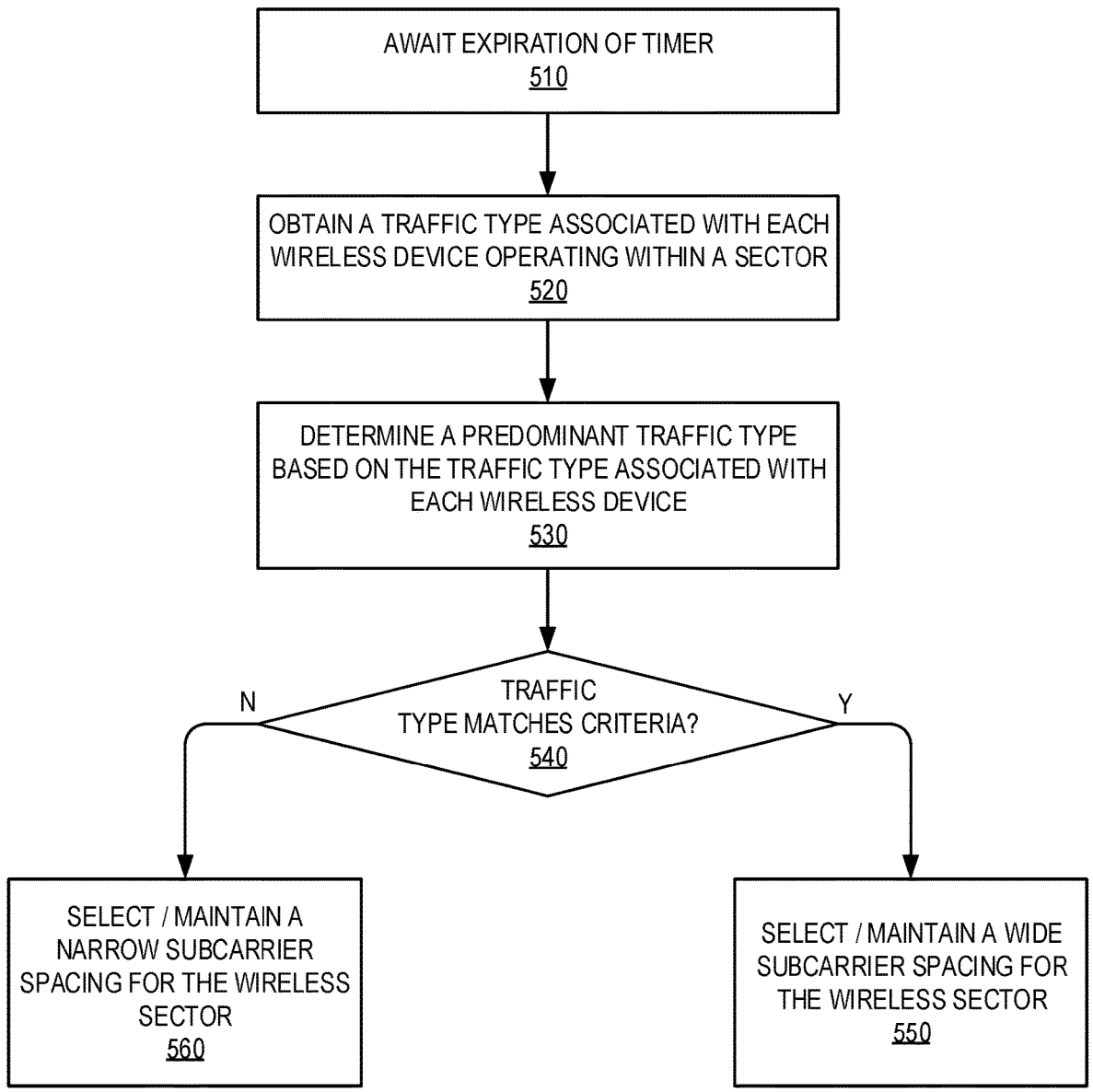
FIG. 5 illustrates another exemplary method for selecting a subcarrier spacing in a wireless network.

FIG. 5 illustrates another exemplary method for selecting a subcarrier spacing in a wireless network. The method will be discussed with reference to the exemplary communication system 100 illustrated in FIG. 1. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 510, a timer expiration is awaited. As described herein, the operations performed by the disclosed embodiments can be performed periodically or upon expiration of a timer. Thus, upon expiration of the timer, at 520, a traffic type associated with each wireless device obtained within a sector is obtained. For example, the wireless sector can be deployed by a first antenna array of an access node. For example, the access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Determining the traffic requirement for each wireless device operating within the wireless sector can include performing packet inspection of data packets received from and transmitted to each wireless device (e.g. DPI), monitoring signaling traffic to and from each wireless device, or monitoring radio or transport bearers. Based thereon, at 530, a predominant traffic type for the wireless sector is determined. For example, determining the predominant traffic type comprises determining traffic types for data packets transmitted from and received at an access node deploying the wireless sector. Further, determining traffic types for data packets transmitted from and received at an access node deploying the wireless sector comprises inspecting a header of bearers set up by the access node. Moreover, the traffic requirements may be based on an amount of each type of traffic, a number of bearers, or any other metric. Further, the traffic requirement for all wireless devices may be averaged, or a median type of traffic requirement may be obtained based on the traffic requirement of all wireless devices within the sector. The predominant traffic type can further be based on an average or median traffic requirement over a period of time, based on the timer in 510.

At 540, the predominant traffic type is matched with one or more criteria and, at 550 and 560, a subcarrier spacing is selected for the wireless sector. For example, upon determining at 540 that the predominant traffic type is among a first plurality of traffic types including guaranteed bit rate (GBR) traffic, latency-sensitive traffic, or heavy traffic, a wide subcarrier spacing is selected based thereon at 550. The wide subcarrier spacing includes any subcarrier spacing that meets or exceeds a defined threshold subcarrier spacing. For example, any subcarrier spacing that is 30 kHz or higher may be determined as a wide subcarrier spacing. In another exemplary embodiment, any subcarrier spacing greater than or equal to 60 kHz is a wide subcarrier spacing. Conversely, a narrow subcarrier spacing can be any subcarrier spacing that is below 30 kHz (i.e. 15 kHz), or below 60 kHz (i.e. 15 kHz and 30 kHz). Consequently, upon determining at 540 that the predominant traffic type does not match the criteria, a narrow subcarrier spacing is selected based thereon, wherein the narrow subcarrier spacing is narrower relative to the first subcarrier spacing. Examples of traffic types other than GBR, latency-sensitive, heavy, VoIP, etc. that are able to use narrow subcarrier spacing include any traffic that does not require a guaranteed QoS or low latency, including web browsing, emails, social media, etc. In an exemplary embodiment, a default subcarrier spacing is selected for a wireless sector based on historical trend of traffic type, and wider or narrower subcarrier spacings are selected based on changes in the predominant traffic type of wireless devices operating within the sector.

Figure 6:
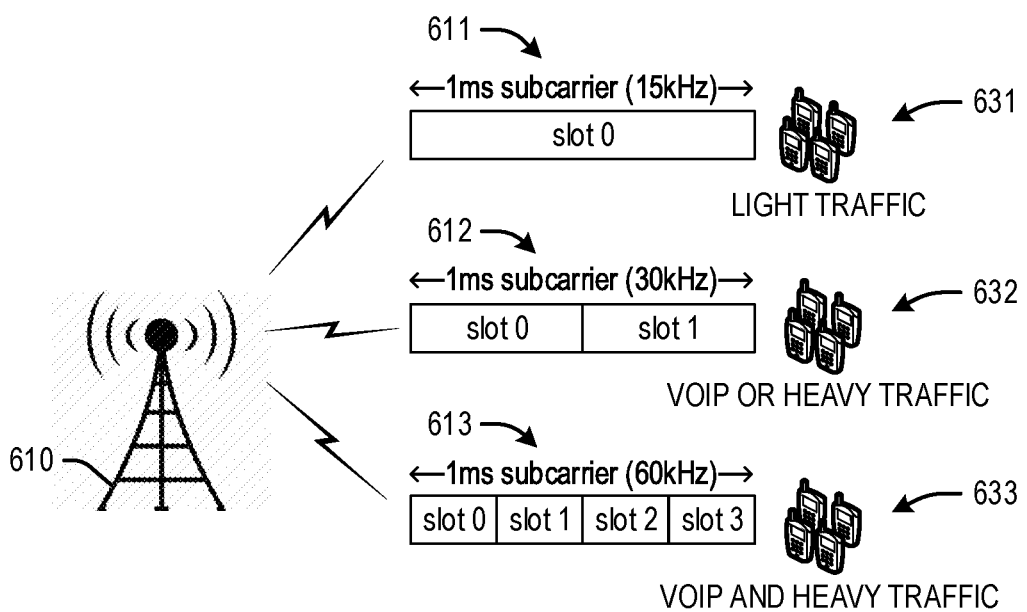
FIG. 6 illustrates exemplary selections of subcarrier spacing for different types of traffic.

FIG. 6 illustrates exemplary selections of subcarrier spacing for different types of traffic. Access node 610 is illustrated as deploying subcarriers with three different spacings 611, 612, and 613, for a corresponding three different sets of wireless devices having predominant traffic types 631, 632, and 633. For example, the first subcarrier spacing 611 may be 15 kHz, and is selected for wireless devices 631 having a predominant traffic type being light traffic, or any other traffic type that is not heavy traffic, or VoIP traffic (which requires a low latency). Each subcarrier spacing has a different arrangement of physical resource blocks in a frequency and/or time domain. For example, subcarriers within the 15 KHz subcarrier spacing 611 occupy fewer frequency resources, but time slots therein may cover a greater time period. Since the subcarrier spacing of 15 kHz is small, subcarriers using adjacent frequencies are more likely to cause interference with each other. Whereas, the second subcarrier spacing 612 may be 30 kHz, and is selected for wireless devices 632 having a predominant traffic type being either VoIP or heavy traffic. Subcarriers within the 30 KHz subcarrier spacing 612 occupy more frequency resources than subcarriers within the 15 kHz subcarrier spacing 611, but time slots therein may cover a smaller time period, such that twice the number of time slots fit within a 1 ms subframe. In this instance, subcarriers using adjacent frequencies are less likely to cause interference with each other, relative to the 15 kHz subcarrier spacing. Finally, the third subcarrier spacing 613 may be 60 kHz, and is selected for wireless devices 633 having a predominant traffic type being both VoIP and heavy traffic. Subcarriers within the 60 KHz subcarrier spacing 613 occupy more frequency resources than subcarriers within the 15 kHz subcarrier spacing 611 or 30 kHz subcarrier spacing 611, and time slots therein may cover a smaller time period, such that four time slots fit within a 1 ms subframe. In this instance, subcarriers using adjacent frequencies are much less likely to cause interference with each other, relative to the 15 kHz subcarrier spacing. It will be appreciated by those of ordinary skill in the art that these depictions of subcarrier spacings and traffic types are merely exemplary, and that other combinations of subcarrier spacings and traffic types may be evident to those of ordinary skill in the art in light of this disclosure.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a subcarrier spacing in a wireless network, the method comprising:
   determining a predominant traffic type within a wireless sector, the predominant traffic type being based on traffic requirements of all wireless devices operating within the wireless sector; and
   selecting a subcarrier spacing for all the wireless devices in the wireless sector based on the predominant traffic type.

2. The method of claim 1, wherein the wireless sector is deployed by a first antenna array of an access node, and selecting the subcarrier spacing comprises instructing the access node to transmit the subcarrier spacing to all the wireless devices in a master information bit (MIB) via the first antenna.

3. The method of claim 2, further comprising repeating the determining and selecting operations for a second wireless sector deployed by a second antenna array of the access node.

4. The method of claim 1, wherein determining the predominant traffic type comprises determining a traffic requirement for each wireless device operating within the wireless sector.

5. The method of claim 4, wherein determining a traffic requirement for each wireless device operating within the wireless sector comprises performing packet inspection of data packets received from and transmitted to each wireless device.

6. The method of claim 1, wherein determining the predominant traffic type comprises determining traffic types for data packets transmitted from and received at an access node deploying the wireless sector.

7. The method of claim 6, wherein determining traffic types for data packets transmitted from and received at an access node deploying the wireless sector comprises inspecting a header of bearers set up by the access node.

8. The method of claim 1, further comprising:
   determining that the predominant traffic type comprises one or more of guaranteed bit rate (GBR) traffic, latency-sensitive traffic, or heavy traffic; and
   selecting a first subcarrier spacing based thereon.

9. The method of claim 1, further comprising:
   determining that the predominant traffic type does not comprise any of guaranteed bit rate (GBR) traffic, latency-sensitive traffic, or heavy traffic; and
   selecting a second subcarrier spacing based thereon.

10. The method of claim 1, wherein the determining and selecting operations are performed responsive to determining that a load of the wireless sector rises to meet a threshold.

11. The method of claim 1, wherein the determining and selecting operations are performed responsive to determining that an inter-subcarrier interference of the wireless sector rises to meet a threshold.

12. A system for selecting a subcarrier spacing in a wireless network, the system comprising:
   a processing node; and
   a processor coupled to the processing node, the processor being configured to perform operations comprising:
      determining a traffic requirement for all wireless devices operating within a wireless sector, wherein the wireless sector is deployed by a first antenna array of an access node;
      determining a predominant traffic type for the sector based on the traffic requirement of all the wireless devices; and
      instructing the access node to select a subcarrier spacing for all the wireless devices in the wireless sector based on the predominant traffic type.

13. The system of claim 12, wherein determining the traffic requirement for the wireless devices is based on one or more of a header, a QCI, or a deep packet inspection for each wireless device.

14. The system of claim 12, wherein the operations further comprise:
   determining that the predominant traffic type comprises one or more of guaranteed bit rate (GBR) traffic, latency-sensitive traffic, or heavy traffic; and
   instructing the access node to select a first subcarrier spacing that is wider than a default subcarrier spacing.

15. The system of claim 12, wherein the operations further comprise:
   determining that the predominant traffic type does not comprise any of guaranteed bit rate (GBR) traffic, latency-sensitive traffic, or heavy traffic; and
   instructing the access node to select a second subcarrier spacing that is narrower than a default subcarrier spacing.

16. The system of claim 12, wherein the determining and selecting operations are performed periodically.

17. The system of claim 12, wherein the determining and selecting operations are performed responsive to a trigger, the trigger comprising one or more of: a load of the wireless sector rising to meet a load threshold, or an inter-subcarrier interference of the wireless sector rising to meet an interference threshold.

18. A processing node for selecting a subcarrier spacing in a wireless network,
   the processing node comprises a processor being configured to perform operations comprising:
      responsive to determining that wireless devices served by a sector of an access node are transmitting or receiving a first type of traffic, instructing the access node to utilize a first subcarrier spacing for all the wireless devices in the sector; and
      responsive to determining that the first type of traffic changes to a second type of traffic, instructing the access node to utilize a second subcarrier spacing for all the wireless devices in the sector.

19. The processing node of claim 18, wherein the first type of traffic comprises one or more of guaranteed bit rate (GBR) traffic, latency-sensitive traffic, or heavy traffic, and the first subcarrier spacing is at least 30 KHz.

20. The processing node of claim 18, wherein the second type of traffic does not comprise any of guaranteed bit rate (GBR) traffic, latency-sensitive traffic, or heavy traffic, and the second subcarrier spacing is below 30 KHz.

* * * * *